(12) United States Patent
Moreno Linares

(10) Patent No.: US 9,962,637 B2
(45) Date of Patent: May 8, 2018

(54) FILTER ELEMENT FOR A LIQUID FILTER

(71) Applicant: Mann+Hummel GMBH, Ludwigsburg (DE)

(72) Inventor: Andrés Moreno Linares, Ludwigsburg (DE)

(73) Assignee: Mann+Hummel GmbH, Ludwigsburg (DE)

(*) Notice: Subject to any disclaimer, the term of this patent is extended or adjusted under 35 U.S.C. 154(b) by 112 days.

(21) Appl. No.: 15/016,572

(22) Filed: Feb. 5, 2016

(65) Prior Publication Data

US 2016/0151727 A1    Jun. 2, 2016

Related U.S. Application Data

(63) Continuation of application No. PCT/EP2014/066711, filed on Aug. 4, 2014.

(30) Foreign Application Priority Data

Aug. 5, 2013  (DE) .................. 10 2013 012 918

(51) Int. Cl.
| | |
|---|---|
| *B01D 35/00* | (2006.01) |
| *B01D 29/03* | (2006.01) |
| *B01D 36/00* | (2006.01) |
| *B01D 29/15* | (2006.01) |

(52) U.S. Cl.
CPC ......... *B01D 35/005* (2013.01); *B01D 29/036* (2013.01); *B01D 29/15* (2013.01); *B01D 36/003* (2013.01); *B01D 2201/291* (2013.01); *B01D 2201/4084* (2013.01)

(58) Field of Classification Search
CPC .................. B01D 29/036; B01D 29/15; B01D 2201/4084; B01D 2201/291; B01D 35/005; B01D 36/003
USPC ....... 210/DIG. 5, 493.2, 450, 437, 342, 337, 210/315
See application file for complete search history.

(56) References Cited

U.S. PATENT DOCUMENTS

| | | | | |
|---|---|---|---|---|
| 4,372,847 | A * | 2/1983 | Lewis ................... | B01D 17/00 123/510 |
| 6,235,194 | B1 * | 5/2001 | Jousset .................. | B01D 29/15 210/206 |
| 6,881,328 | B2 | 4/2005 | Dittmann et al. | |
| | | | (Continued) | |

FOREIGN PATENT DOCUMENTS

| | | |
|---|---|---|
| DE | 102010030987 A1 | 1/2012 |
| DE | 102010063161 A1 | 6/2012 |
| | (Continued) | |

*Primary Examiner* — Madeline Gonzalez
(74) *Attorney, Agent, or Firm* — James Hasselbeck

(57) ABSTRACT

An annular filter element, including: a filter medium having circumferentially closed about an axis and extended along the axis, the axis defining an axial direction; wherein the filter medium has a radially outer flow face and a radially inner flow face, the radially inner flow face surrounding an inner clean space in the filter element; wherein the filter element is through-flowable radially from a radial outside to a radial inside of the filter element; a water separation screen inserted into the clean space, the water separation screen formed separately from the filter element, the water separation screen connected to the filter element or to a component situated at the filter element.

12 Claims, 4 Drawing Sheets

(56) References Cited

U.S. PATENT DOCUMENTS 8,034,240 B2 * 10/2011 Reiland .................. B01D 27/08
                                                                            210/299
2003/0010706 A1      1/2003 Baracchi et al.

FOREIGN PATENT DOCUMENTS

| EP | 1199093 A1 | 4/2002 |
|----|------------|--------|
| EP | 2602473 A2 | 6/2013 |
| WO | 2011107262 A1 | 9/2011 |
| WO | 2012097851 A1 | 7/2012 |

* cited by examiner

FILTER ELEMENT FOR A LIQUID FILTER

TECHNICAL FIELD

The present invention relates to a filter element for a liquid filter, in particular for fuel.

BACKGROUND OF THE INVENTION

The publication WO 2004/082804 A1 describes a filter system for diesel fuels, which has an annular particle filter as a filter element in a filter housing. Also, an annular coalescing element is connected upstream of the filter element, which has the object to aggregate droplets of water dispersively present in the fuel into larger droplets to facilitate the water separation. The coalescing element is mounted upstream of the filter element; both components are mounted about a center pipe centrally situated in the receiving space of the filter housing, which serves to discharge the cleaned fuel.

When filtering fuel, first the coalescing element is through-flown radially from the outside to the inside, a separation of droplets of water occurring at the interior wall of the embracing filter housing, which outflow downward into a water reservoir. Subsequently, the fuel is passed radially from the outside to the inside through the filter element and the cleaned fuel is axially discharged via the center pipe.

Furthermore, it is known from the publication EP 1 326 693 B1 to through-flow an annular filter element radially from the outside to the inside, having a cylindrical clean space having a center pipe, for filtering hydraulic oil. The filter device has a bypass valve between the raw side and the clean side, which is loaded with force in the closing position by a pressure spring, which is braced at a screen housing protruding into the interior of the filter element. When opening the bypass valve, the unfiltered fluid flows through the wall of the screen housing into the clean space.

SUMMARY OF THE INVENTION

The object of the present invention is to effectively separate dispersively contained droplets of water with simple, constructive measures when filtering liquids.

The filter element according to the present invention is inserted into a liquid filter, which advantageously is a fuel filter, preferably a diesel fuel filter. An application for, for example, filtering hydraulic oil is, however, also possible.

In a filter housing, the liquid filter has an annular filter element, which particularly serves as a particle filter and which is radially through-flown from the outside to the inside. The interior of the hollow cylindrical filter element forms the clean space via which the cleaned fluid is axially discharged. A center pipe may be inserted into the clean space, adding stability to the filter medium of the filter element which, for example, is embodied in a pleated manner.

The filter element has a water separation screen which is inserted into the interior of the filter element, if applicable, into the center pipe. The water separation screen forms a component configured separately from the filter element or from the center pipe and is connected to the filter element or a component situated at the filter element. The droplets of water, which are included in the liquid, thus, for example, in the fuel or the hydraulic oil, are separated at the water separation screen. The clean space in the filter element is axially flow-connected at one end to a water collecting space situated in the filter housing and, at the other end, to a liquid outflow line, via which the cleaned fluid is discharged from the liquid filter. The discharge of the separated water at the water separation screen on the one hand and of the cleaned liquid on the other, thus, occurs in axially opposite directions from the clean space within the filter element. This, for example, enables an arrangement of the liquid filter in which the water collecting space is situated in the bottom area of the filter housing and the cleaned fluid is discharged axially upwards from the clean space. The water received into the water collecting space may, for example, be discharged from the filter housing via a valve. Thus, the outflow of separated droplets of water from the water separation screen into the water collecting space is carried out in the direction of the weight of the droplets of water.

The water separation screen may be inserted in the center pipe and is through-flown by the cleaned fluid. Advantageously, the outer diameter of the water separation screen is smaller than the interior diameter of the center pipe. The cleaned fluid flows radially from the outside through the openings in the wall of the water separation screen to the inside and subsequently flows axially from the clean space. The droplets of water carried along in the liquid are separated at the outer shell of the water separation screen, which, following the weight force, are guided downwards at the outer wall of the water separation screen in the direction of the water collecting space.

The connection between the water separation screen and the filter element or a component of the filter element is particularly carried out in a releasable manner, for example, via a latch connection so that when the latch position is achieved, the water separation screen is positively and/or non-positively connected to the filter element or to a component of the filter element. Expediently, the water separation screen is connected to an end plate which is fitted at the end face onto the filter medium of the filter element. It is categorically also possible to connect the water separation screen to the center pipe.

Preferably, the water separation screen is cylindrically formed, a conical embodiment of the water separation screen being also conceivable. The water separation screen expediently extends over the total axial length of the clean space or of the center pipe in the clean space.

According to a further expedient embodiment, a coalescing element expediently integrated in the filter element is, in addition to the filter element, situated in the liquid filter. The fluid to be cleaned is a dispersive mixture of two liquids, for example, fuel having dispersively embedded water, which are to be separated from each other. With the aid of the coalescing element, fine droplets of water may be joined to larger droplets, however, without causing a separation. Thus, only larger droplets of water are generated in the coalescing element which, after through-flowing the coalescing element, are separated at the water separation screen located in the clean space. The coalescing element is, for example, situated on the clean side of the filter element, particularly between the radial interior side of the filter medium of the filter element and the center pipe. It may be also considered that the coalescing element is situated on the raw side of the filter element or that it is integrated into the filter element.

For a flow-proof connection between the raw side and the clean side of the filter element, it is advantageous to provide a sealing element between the water separation screen and the component of the filter element at which the water separation screen is held. Insofar as the water separation screen is connected to the end plate, the sealing element may be situated between a collar of the water separation screen and the end plate. The collar is integrally formed with the water separation screen and is located at the end face of the water separation screen. It may be expedient to configure the collar having a greater outer diameter than the separation shell of the water separation screen.

The sealing element between the water separation screen and the component of the filter element is either integrally formed with the collar, particularly as a sealing lip molded onto the collar, or formed as a separate sealing element in the form of a sealing ring.

A further exemplary embodiment relates to an annular filter element for a liquid filter, through-flowable radially from the outside to the inside, having an interior clean space in the filter element into which a water separation screen is inserted, which is formed separately from the filter element and which is connected to the filter element or a component situated at the filter element, the filter element being formed by a coalescing element. Thus, first the coalescing element and subsequently the water separation screen is through-flown, both forming a joint assembly. A particle filter is not mandatory in this exemplary embodiment.

BRIEF DESCRIPTION OF THE DRAWINGS

Further advantages and expedient embodiments may be concluded from the further claims, the description of the figures and the drawings.

In the figures, same components are provided with the same reference characters.

DESCRIPTION OF THE INVENTION

Figure 1:
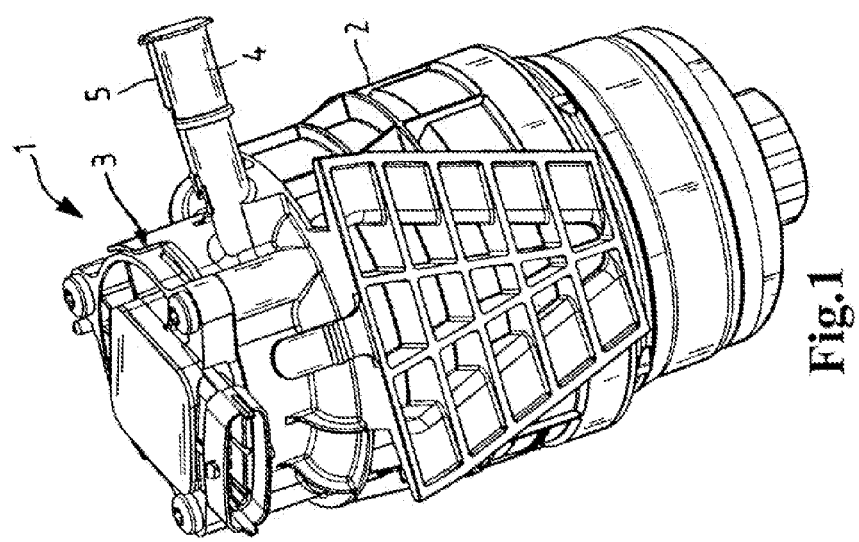
FIG. 1 shows a perspective view of a liquid filter for filtering fuel.

FIG. 1 perspectively shows a fluid filter 1 for filtering fuel, preferably diesel fuel. In a filter housing 2, liquid filter 1 has a filter element for filtering the fuel. In the upper end face region of filter housing 2, a heating device 3 is located, in which the supplied fuel is preheated before it is fed into the filter element in filter housing 2. A radial inflow line 4 for supplying the unfiltered fuel and a radial outflow line 5 for discharging the filtered fuel is also located in the upper region of filter housing 2.

Figure 2:
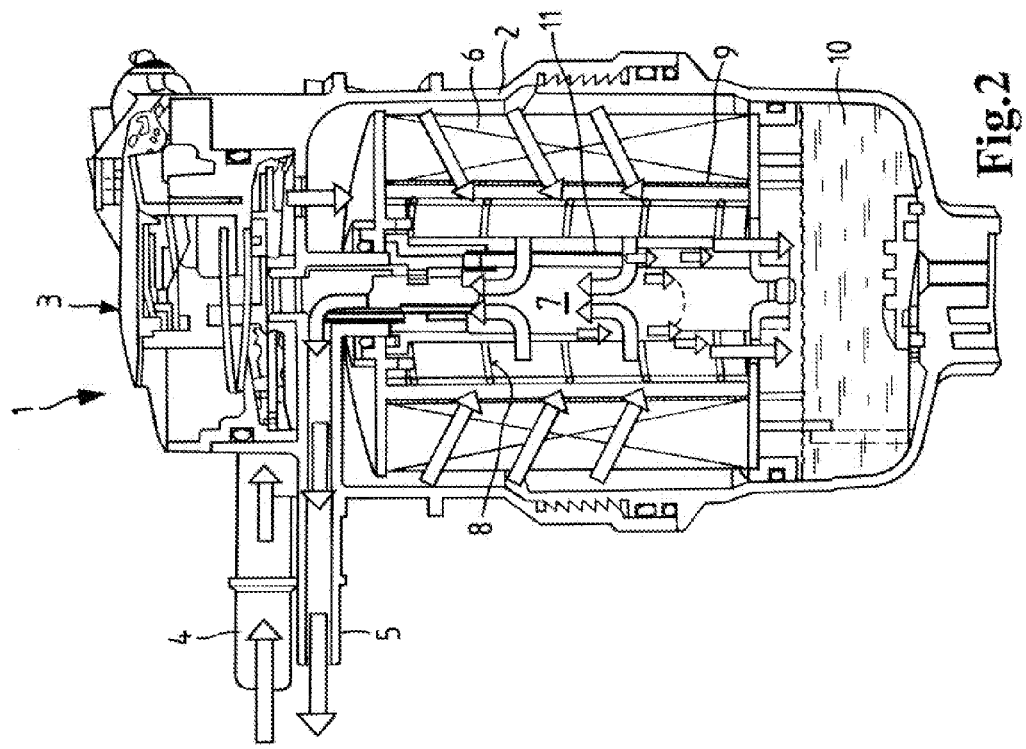
FIG. 2 shows a longitudinal section through the liquid filter having marked flow arrows to indicate the flow path.

FIG. 2 shows liquid filter 1 in a longitudinal section. Filter housing 2 accommodates annular filter element 6, which is through-flown radially from the outside to the inside by the fluid to be filtered. Accordingly, the cylindrical interior in filter element 6 forms clean space 7 from which the cleaned fluid is axially discharged.

A center or support pipe 8, which preferably is made out of plastic and braces the filter medium of filter element 6 and which provides stability to said filter medium, is inserted into clean space 7 of filter element 6. Central pipe 8 lines clean space 7.

A coalescing element 9 delimited radially inwards by center pipe 8 is located on the radially interior side of the filter medium of filter element 6. An agglomeration of finely distributed droplets of water in the fuel occurs in coalescing element 9 so that said droplets accumulate into larger droplets.

A water collecting space 10, in which water separated when filtering the fluid is collected, is located in the bottom region near the ground in filter housing 2. The collected water can be discharged from water collecting space 10 in the filter housing via a bottom sided opening and a valve.

A water separation screen 11, embodied as a hollow cylinder and having an outer diameter which is smaller than the interior diameter of center pipe 8, is inserted into clean space 7 so that an intermediate annular space is formed. Water separation screen 11 extends axially like center pipe 8 over the total length of clean space 7 or of filter element 6. The droplets of water carried along in the fuel, are separated at the outer surface of separation shell 11A of water separation screen 11. As indicated by the vertical downward pointing arrow, the separated droplets of water are discharged via the bottom axial end face of clean space 7 into water collecting space 10.

The wall of water separation screen 11 has a plurality of passage openings, via which the cleaned fuel may through-flow radially inwards from the annular space between center pipe 8 and water separation screen 11 into the interior of water separation screen 11. Subsequently, the cleaned fuel liberated from the water droplets is axially discharged via the end face of clean space 7 lying axially on the top, which is flow-connected to outflow line 5.

Figure 3:
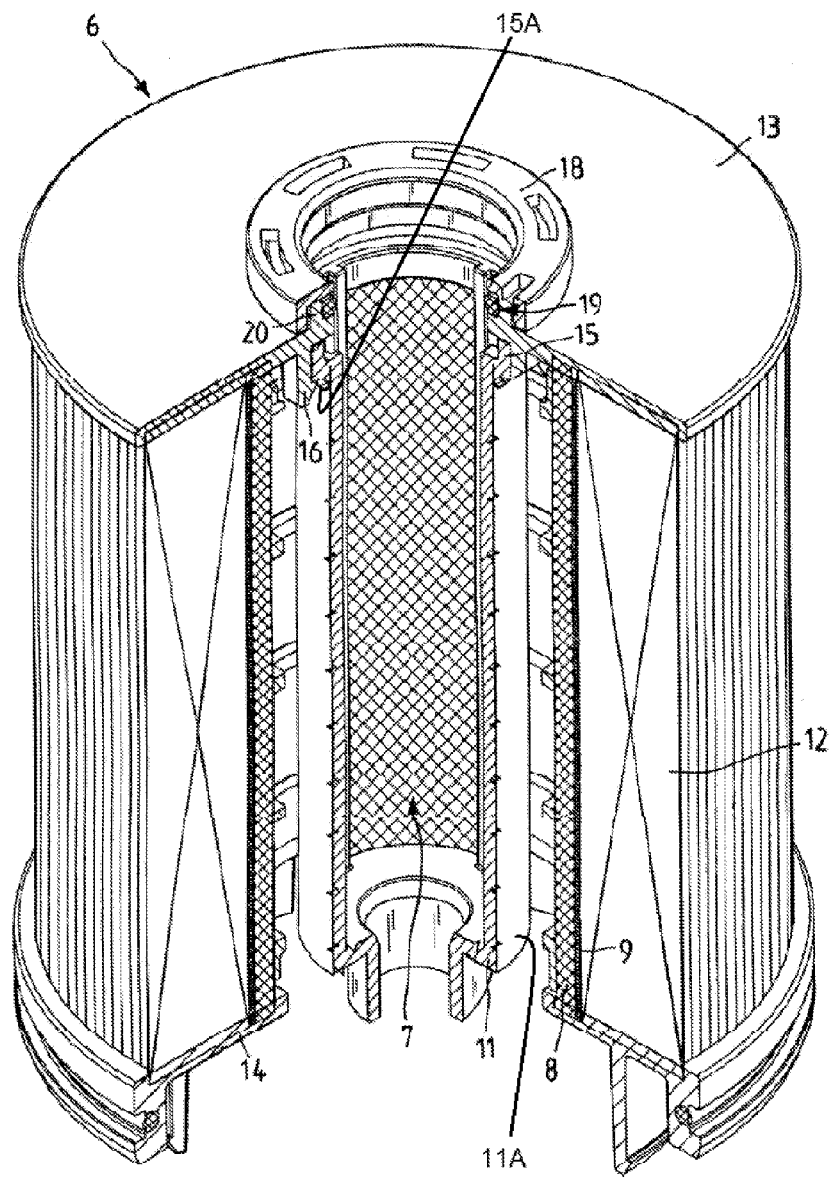
FIG. 3 shows a perspective, partially sectional view of a filter element, which is part of the liquid filter, having a water separation screen situated in the interior clean space.
Figure 4:
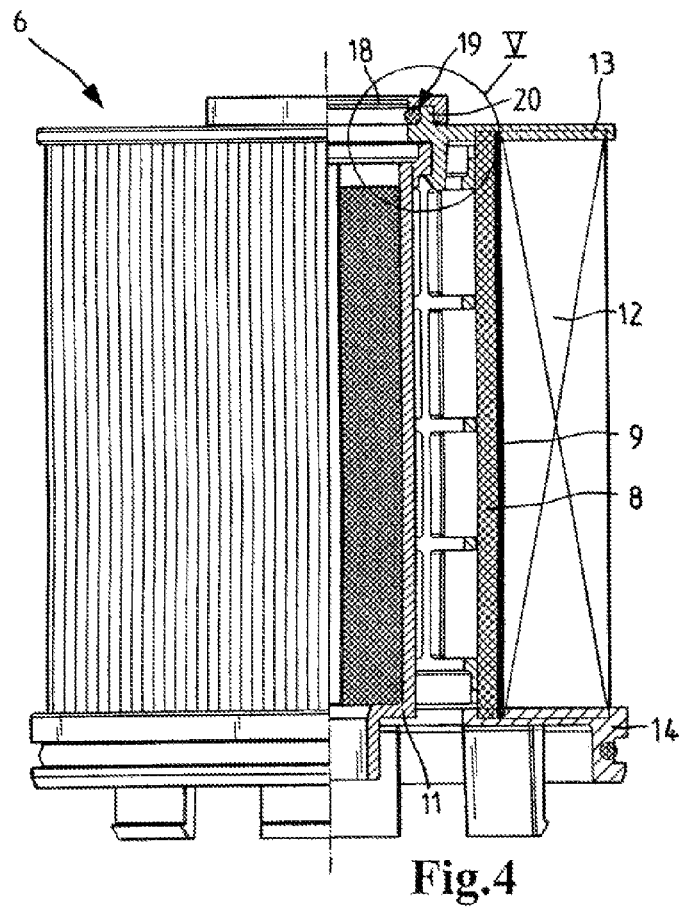
FIG. 4 shows a further, partially sectional illustration of the filter element.

FIG. 3 shows filter element 6 in a perspective and partially sectional view. Filter medium 12 of filter element 6 is embodied as a pleated filter and is enclosed on both end faces by respectively one end plate 13, 14. In the area of upper end plate 6, via the central opening of which the cleaned fluid is discharged from clean space 7, water separation screen 11 has a radially widened collar 15 connected in a latch-closing manner via snap or latch hooks 16 to end plate 13. Latch hooks 16 are molded at the inward facing side at end plate 13 or integrally formed with end plate 13 (see also FIGS. 4, 5). In the connected state, latch hooks 16 engage behind a circumferential, radially outer ring shoulder 15A at collar 15.

Figure 5:
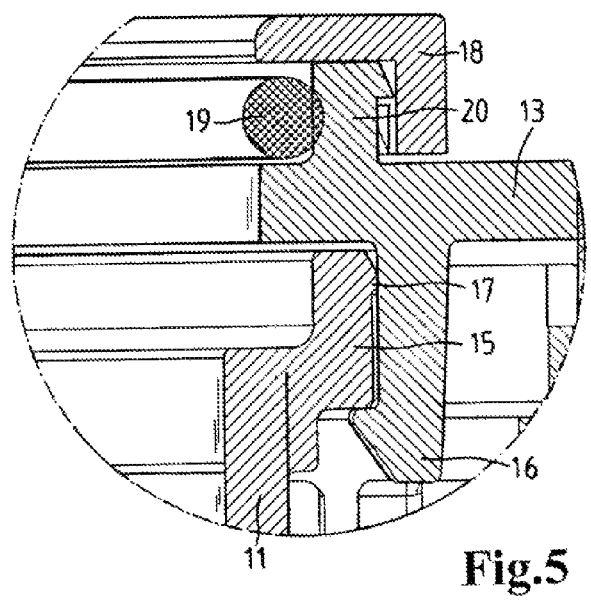
FIG. 5 shows an enlarged view of detail V from FIG. 4.

As may particularly be concluded from FIG. 5, a sealing lip 17, which abuts at the radially inner side of latch hooks 16, is molded adjacent to the free end face and, in the radially outer area, to collar 15. Latch hooks 16 may optionally also be configured as a continuous circumferential latch ring at the bottom side of end plate 13. A flow-proof seal between the radially outer clean side having water containing fuel and the radially inner clean side having fuel not containing water is provided via sealing lip 17.

End plate 13 has on its axially outward facing end face an axially protruding support collar 20, onto which a cover 18 is fitted. On the radially inner side of support collar 20, a sealing ring 19 is located, which, as may be concluded from FIG. 3, is braced radially outwards at a section of end plate 13.

As may further be concluded from FIG. 5, the free end face of collar 15 is, in the assembled state, located directly below end plate 13. During assembly, water separation screen 11 has to be inserted axially from the opposite side into clean space 7 or center pipe 8.

Figure 6:
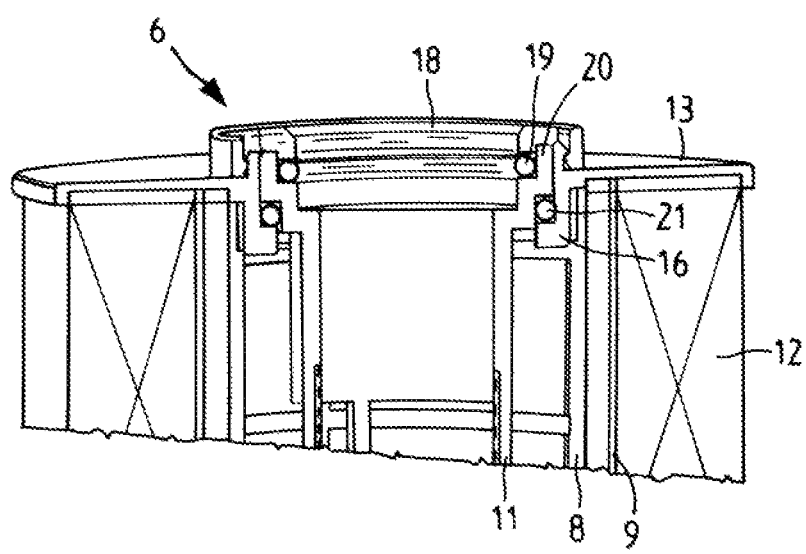
FIG. 6 shows an end face connection between the water separation screen and an end plate of the filter element in a variation of the embodiment.

FIG. 6 shows a variation of the embodiment of filter element 6, in which the sealing between water separation screen 11 and upper end plate 13, in contrast to the preceding exemplary embodiment, is not carried out via a molded sealing lip but via a separately configured sealing ring 21.

Sealing ring 21 is braced radially inwards at a circumferential ring shoulder at end face support collar 20 of water separation screen 11. Sealing ring 21 abuts radially outwards at the inner surface of latch hooks 16 or, in the case of a circumferential embodiment, of the latch collar, which is integrally formed with end plate 13 and which is located at the bottom side of end plate 13. For installation, water separation screen 11 may be inserted in the axial direction from above through upper end plate 13 into the clean space in filter element 6.

What is claimed is:

1. An annular filter element, comprising:
a filter medium having circumferentially closed about an axis and extended along the axis, the axis defining an axial direction;
wherein the filter medium has a radially outer flow face and a radially inner flow face, the radially inner flow face surrounding an inner clean space in the filter element;
wherein the filter element is through-flowable radially from a radial outside to a radial inside of the filter element;
an end plate having:
an axial inner surface; and
an opposite axial outer surface;
wherein the axial inner surface of the end plate is arranged direct on an axial end face of the filter medium;
a water separation screen inserted into the clean space, the water separation screen formed separately from the filter element, the water separation screen connected to the filter element or to a component situated at the filter element;
wherein the water separation screen is arranged at and connected directly onto the axial inner surface of the end plate, the water separation screen having a radially widened collar having a ring shoulder formed by axial end face of the collar furthest from the end plate;
wherein the end plate has a latching member latchably engaging against the ring shoulder to axially latch the water separation screen onto the end plate.

2. The filter element according to claim 1, wherein the water separation screen is connected to the axial inner surface of the end plate.

3. The filter element according to claim 2, wherein the water separation screen has a collar arranged proximate to an axial end of the water separation screen;
wherein the collar of the separation screen is directly connected onto the axial inner surface of the end plate;
wherein a sealing element is provided between the collar and the end plate.

4. The filter element according to claim 3, wherein the radially widened collar forms a radially outward projecting sealing lip, the sealing lip of the radially widened collar is the sealing element, sealing to the end plate.

5. The filter element according to claim 3, wherein the sealing element is configured as a separate sealing ring situated between the radially widened collar and the end plate.

6. The filter element according to claim 3, wherein the water separation screen has a separation shell having an outer diameter;
wherein the radially widened collar has an outer diameter that is greater than the outer diameter of the separation shell.

7. The filter element according to claim 1, wherein the water separation screen is cylindrically formed.

8. The filter element according to claim 1, wherein a coalescing element is arranged adjacent to the filter element.

9. The filter element according to claim 8, wherein the coalescing element is arranged at a clean side of the filter element.

10. The filter element according to claim 1, comprising:
a tubular center pipe is inserted into the clean space of the filter element;
the water separation screen is inserted into and arranged in the center pipe.

11. A liquid fuel filter, comprising:
a filter housing;
a filter element according to claim 1 arranged within an interior of the filter housing.

12. The liquid fuel filter according to claim 11, wherein the housing includes a water collecting space for collecting water separated from the fuel;
wherein the clean space in the filter element is flow-connected at a first axial end to the water collecting space;
wherein the clean space is flow-connected at an opposing second axial end to a liquid outflow line for the cleaned liquid.

* * * * *